W. W. BONSON & W. L. McLAUGHLIN.
DRY ORE SEPARATING MACHINE.
APPLICATION FILED NOV. 12, 1907.

933,053.

Patented Sept. 7, 1909.
6 SHEETS—SHEET 5.

WITNESSES:
Vida L. Hatter,
F. J. Hyde

INVENTORS
William W. Bonson
BY Willson L. McLaughlin
M. M. Cady
ATTORNEY.

UNITED STATES PATENT OFFICE.

WILLIAM W. BONSON AND WILLSON L. McLAUGHLIN, OF DUBUQUE, IOWA, ASSIGNORS TO HIGHSPEED DRY CONCENTRATING COMPANY, OF PHOENIX, ARIZONA TERRITORY, A CORPORATION OF ARIZONA TERRITORY.

DRY-ORE-SEPARATING MACHINE.

933,053.  Specification of Letters Patent.  Patented Sept. 7, 1909.

Application filed November 12, 1907. Serial No. 401,870.

*To all whom it may concern:*

Be it known that we, WILLIAM W. BONSON and WILLSON L. McLAUGHLIN, citizens of the United States, residing at Dubuque, in the county of Dubuque and State of Iowa, have invented certain new and useful Improvements in Dry-Ore-Separating Machines, of which the following is a specification.

Our invention relates to the separation of ore from the gangue with special reference to such separation while the mass is dry and the object is to provide a machine that shall be simple and inexpensive in construction and can be operated without the assistance of experts and which shall have not only a greatly increased capacity but many times greater than those now on the market whereby they may be used at a greatly increased profit commercially.

It essentially consists in a jig or bed upon which the ore and gangue is delivered which bed is adjustably hung on an incline longitudinally and adapted to be moved backward and forward longitudinally and which bed is covered with a mesh, preferably some textile fabric, and over the mesh two series of deflectors, the lower having their upper surface inclined longitudinally and set at an angle to the line of motion of the bed and the upper series of deflectors secured to the top of the lower deflectors at an angle to the lower deflectors and at an angle to the line of motion of the bed forming diagonally disposed runways decreasing in depth from one side to the other of the bed along which the ore is forced diagonally into a single runway along one side of the bed and the gangue is forced into a runway on the other side of the bed and during all the movements of the bed and mass over the bed and between the deflectors the mass will be subjected therethrough to the action of constant air pressure, or current of air either cold or heated and these together with the motions of the bed and deflectors thereon will crowd the ore and gangue in oppositely diagonal directions to the sides of the bed and thus increase greatly the rapidity of separation.

Further it consists in imparting to the mass to be separated while upon the mesh and among the deflectors and subject to the action of the air pressure, various movements, whereby, with the air, the mass is first stratified into a stratum of gangue and ore and the gangue is directed and crowded by the upper deflectors to one side of the bed and the ore by the lower deflectors diagonally to the opposite side of the bed and beneath the upper deflectors at an angle to a line parallel with the motion of the bed, and by the motion of the jig and peculiar construction there will be a great increase in capacity and purity of separation.

The following specification, when read in connection with the drawings accompanying the same and forming a part hereof, will describe the construction of our machine and its mode of operation whereby we accomplish the ends sought.

Like characters of reference, denote corresponding parts in each of the figures.

Figure 1:
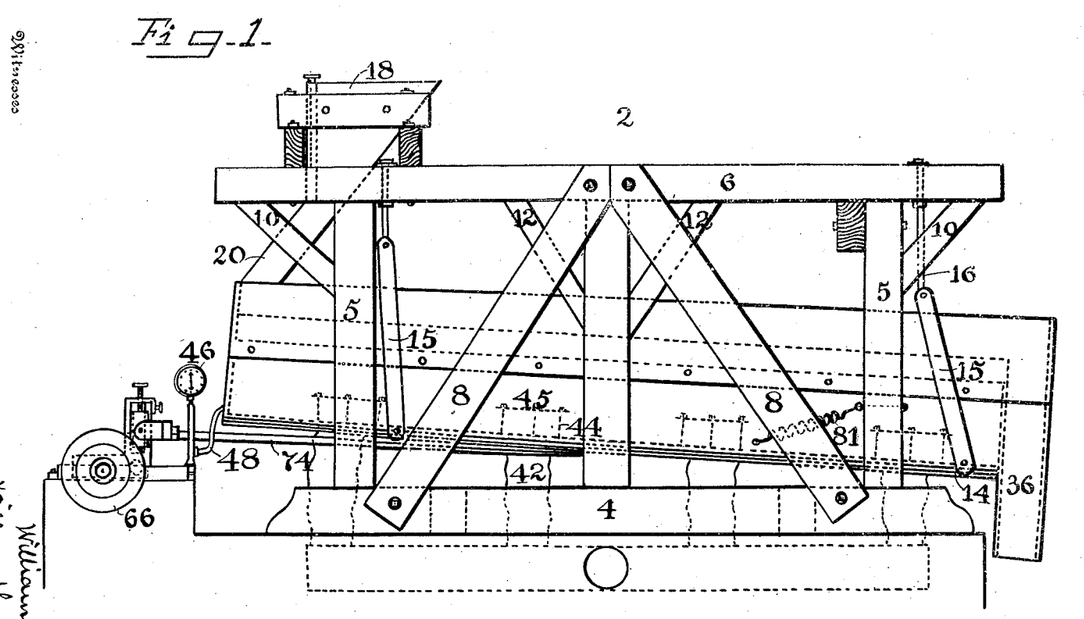
Figure 1 is a side elevation.
Figure 2:
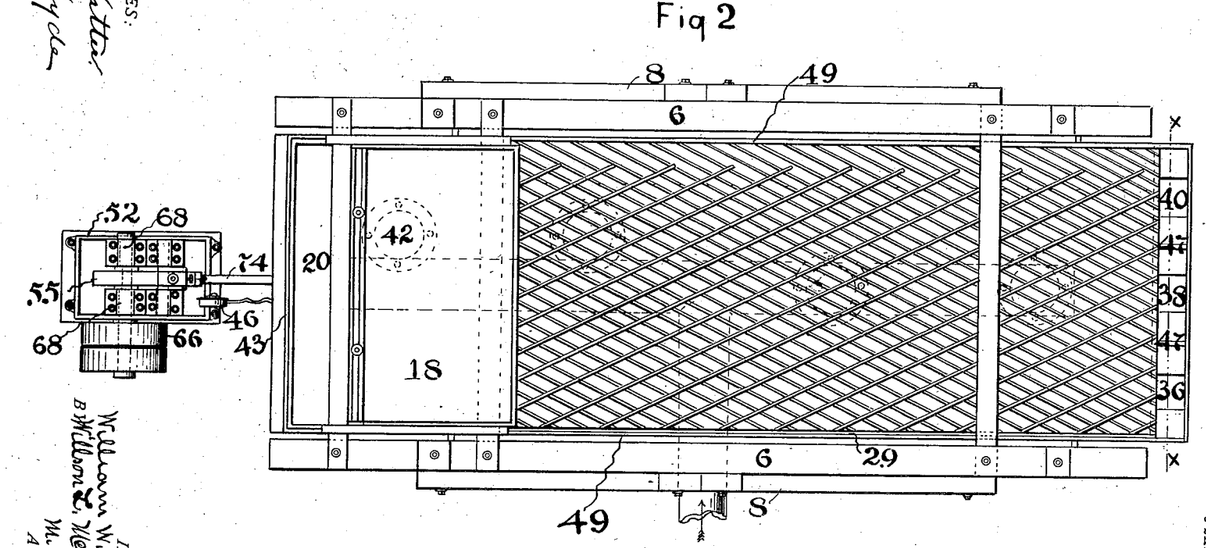
Fig. 2 is a plan view.

Referring to the drawings, 2 designates the machine which consists of a base 4, to which are secured on each side the uprights or standards 5. The tops of these standards are secured into longitudinal rails 6 and are stayed by the braces 8 attached to the base 4 and top rails 6. It is further stayed by the braces 10 and 12, the whole constituting a frame. Within the frame is suspended a jig or separator, to which are imparted various motions and on which the ore is separated while subjected to the action of the air. The jig is provided with a base board 14 extending over its under surface and is suspended to the top rails 6 by hangers 15 pivoted at one end to the base and at the other end to adjustable suspension rods 16 passing through the top rails 6, for adjusting the jig to any longitudinal pitch required for different sizes and classes of ore. It will be noticed that the hangers 15 are pivoted at an angle for the purposes presently to appear.

On the forward end of the top rails is secured a hopper 18 having a chute 20 extending crosswise of the jig by which the mass to be separated is delivered all along the front end of the jigging bed.

Upon beams running crosswise on the inside of the jig (not shown) are secured a series of supports 22 (see Figs. 6 and 7) beveled or wedge shaped at their top and set diagonally at a short distance apart, leaving an air space beneath the supports above the bottom of the jig and spaces 24 between the supports for the air to pass up therethrough. Upon the top of the supports is stretched and secured a mesh 25 or textile fabric which is preferably canvas and over the mesh 25 and parallel with the supports 22 is secured to the supports a series of right-hand deflectors, illustrated in Figs. 4 and 5. These deflectors that are attached at one of their ends at intervals along the left side of the jig, are thin for a short distance at 30, then abruptly increased in thickness, forming shoulders 32, and gradually inclining or tapering on their upper surface toward their other ends at the right side of the jig where they are very thin and, as they are secured in a diagonal position on the bed of the jig, those near the tail will each be shorter than the next one on the right and at 34, near the left end corner of the jig, only a short distance will remain of the increased thickness. As each one toward the right is longer than the one contiguous on the left it will have inclined or tapered more before it reaches the tail end of the jig and the one 36 at the right corner of the tail of the jig will be practically the same thickness as all those that terminate in the right side of the jig. All of these deflectors 26 are preferably of the same width from end to end and are only inclined on their upper surface. It will be seen by the shape of these deflectors, with all of their shoulders 32 of the same thickness and diagonal mode of setting them, that there will be a gradual incline from the upper surface of the deflectors at 34 on the left to the right side.

Figure 3:
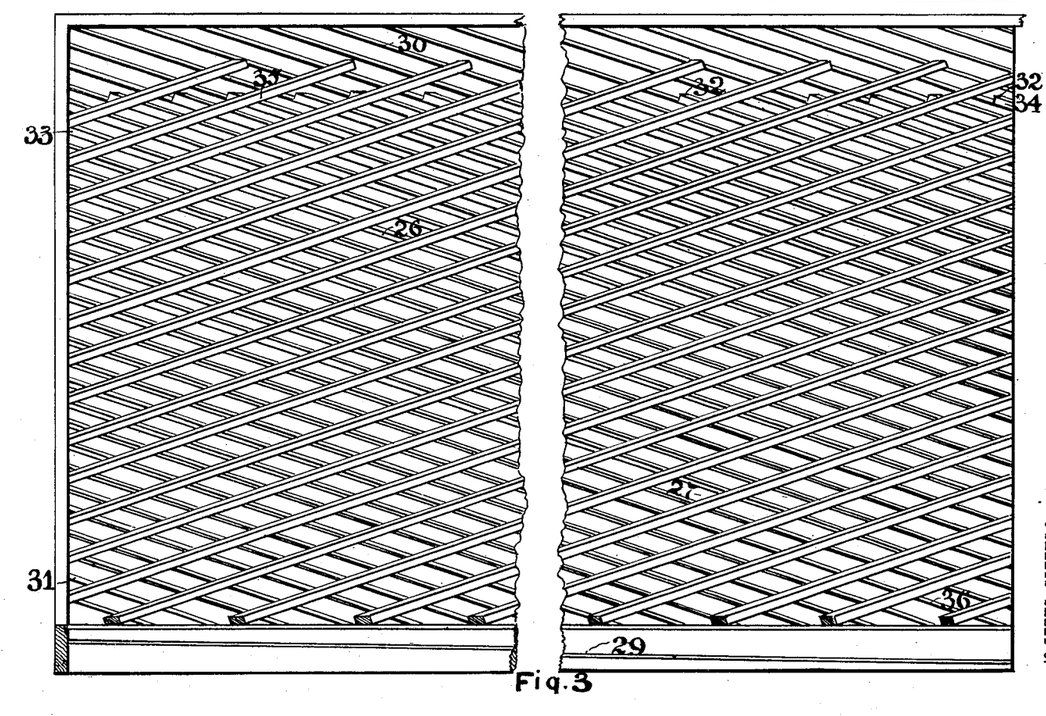
Fig. 3 is a perspective view of the bed of the jig showing the deflectors in position.
Figures 4, 5:
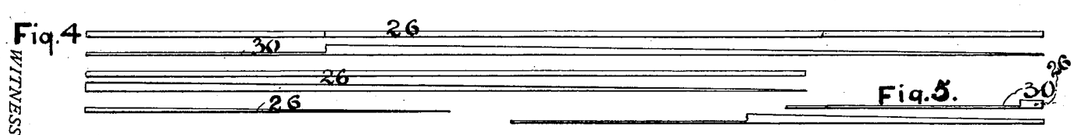
Fig. 4 is a side elevation of three different deflectors from head end, and a plan view of part of the same.
Fig. 5 is a side elevation of two deflectors from tail end.

The deflectors 26 that are attached at one of their ends along the front end of the jig, beginning at 33, are all of the same width as the deflectors secured on the left side of the jig but have no shoulders 32 nor thin part 30. Also these deflectors gradually and uniformly incline or slant from their front to their tail ends but each to the right is a trifle thinner at its beginning than the one adjacent to it on the left till the last one 31 at the right front corner of the jig is practically the same thickness as all the others are at their ends where they approach and are at the same distance from the right side of the jig and each one tapers or inclines its entire length. It will be seen that now the whole upper surface of the deflectors 26 will be in an inclined plane commencing on the left at the top of the abrupt increase or shoulder 34 and gradually inclining downwardly to the right side of the jig where it will be only slightly raised from the mesh on the jig, just enough to allow the ore of that class to pass under the upper deflectors but the bed of the jig will remain in a horizontal plane or longitudinally inclined only. These deflectors 26 direct and crowd or force the ore as it is separated from the gangue diagonally toward one side of the jig into a runway along the side of the jig and oppositely from the gangue and also provide runways for the ore, decreasing in depth, diagonally across the bed of the jig, whereby when a forward and backward motion is imparted to the jig the deflectors will crowd or force the ore diagonally into the longitudinal runway 29 at one side of the jig along the diagonal runways between the inclined deflectors.

Upon the diagonal right-hand deflectors 26 are secured a series of diagonal left-hand deflectors 35 which are, preferably somewhat thicker than the deflectors 26 and uniform in thickness and in width but are set considerably farther apart and extend from the right side to nearly the left side of the jig. As the deflectors 35 are of uniform thickness and are secured rigidly upon the upper surface of the deflectors 26, the inclined plane of the upper surface of the deflectors 35 will be parallel with the upper inclined surface of the deflectors 26. These deflectors 35 are for the purpose of directing and urging or forcing the stratum of gangue of the mass to be separated, after the mass has been stratified, from off the stratum of ore diagonally toward the left side of the jig or opposite side from the ore.

It is manifest that instead of securing the lower deflectors to the bed of the jig, whereby they will direct and force the ore to the right and the upper deflectors so that they will urge the gangue to the left, they might be reversed and the ore carried to the left and the gangue to the right and still be equally effective. The side in which the different deflectors terminate is immaterial.

By tapering or inclining the upper surface of the under deflectors, and securing upon them the upper deflectors, there will be provided diagonal runways 27 decreasing in depth from one end to the other for the ore, and openings underneath the upper deflectors decreasing in size from one side of the surface to the other, whereby the different particles of ore may be separated from the gangue and carried or forced along the runways 27 under the upper deflectors diagonally to one side of the jig and out into the longitudinal runway 29 into the discharge at the tail of the jig and the gangue held above the ore by pressure of air and the greater gravity of the ore will be crowded to the opposite side of the bed of the jig by the upper deflectors and carried along over the deflectors 26 and down the side of the bed over the flat portion 30 of the deflectors 26 and delivered into the discharge for the gangue.

The leading object of inclining the under deflectors 26 upon their upper surface whereby the runways 27 are constantly decreasing in depth from one side of the bed of the jig to the other side, is to provide for the separation of a mass of different percentage of ore. Where the mass has only a small percentage of ore, then, when it is stratified the stratum of ore will be exceedingly thin with a stratum of gangue over it and both will pass underneath the deflectors 35 near the left side of the jig but when they have been forced along the runways and underneath the upper deflectors till they come near the right side where the runways are so shallow in depth that the combined strata of ore and gangue will be of equal or greater thickness than the depth of the runways then the upper deflectors will force the gangue toward the left side off the ore and the ore will pass underneath the upper deflectors and be forced into the runway 29 on the right side of the jig. Hence, by inclining these under deflectors and making the openings underneath the upper deflectors varying in size, and the runways decreasing in depth according to the classification of the ore to be separated, there will be a complete separation whether there be a larger or smaller percentage of ore in the mass and a jig constructed in this manner will adjust itself for any variations in the percentage of ore without the operator making any change whatever in the feed or speed of the machine and the line of ores may increase or decrease in breadth or thickness as the ore varies in richness without any readjusting of the jig. All the operator has to do is to vary the position of the gates whereby a greater or less quantity of ore and proportionate quantity of gangue is directed into the discharge.

At the tail end of the jig are three discharges, one for the ore 36, one 38 for the middlings or part ore and part gangue, and one 40 for the gangue. These discharges (see Fig. 6) consist of tapering boxes secured to the sides of the jig and to each other and terminate in preferably flexible tubes. At the top of the boxes are pivoted partitions or gates 47 which can be turned to the right or left, whereby more or less of the separated mass may be directed at will into each discharge. The jig is boxed in at the front end by the end piece 43 and the sides by the plates 49, and it may be covered over the deflectors to keep the dust from escaping into the open air and provided with means for disposing of the dust.

Figures 7, 8:
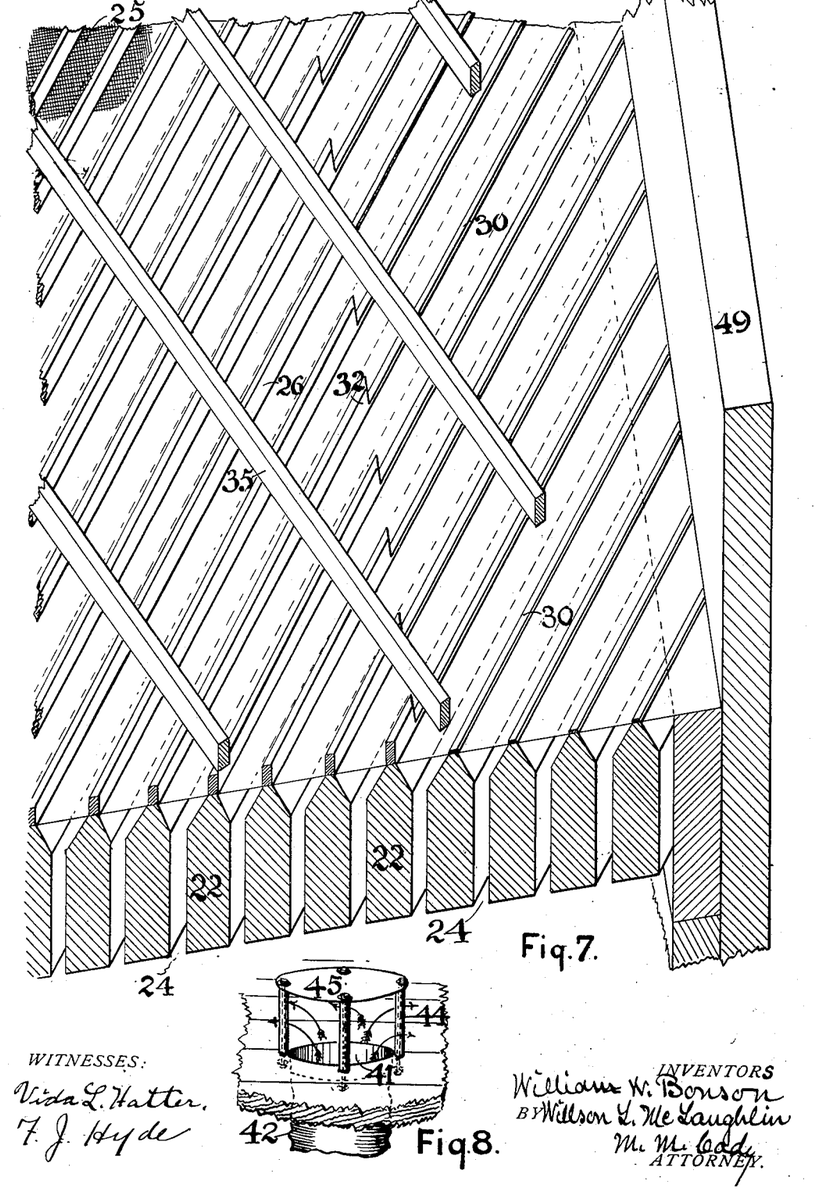
Fig. 7 is a perspective end view large size of a section of the jig.
Fig. 8 is a perspective view of the air spreader.
Figure 9:
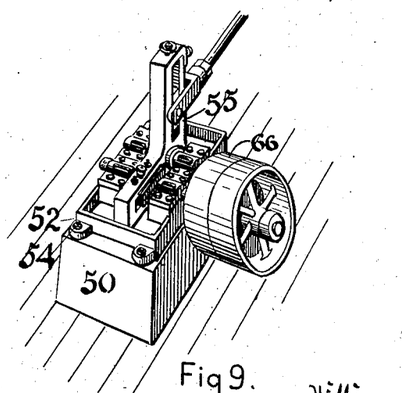
Fig. 9 is a perspective view of the means for imparting the different motions to the jig.
Figure 10:
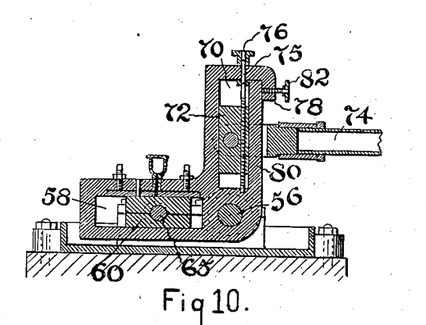
Fig. 10 is a vertical section through line Y—Y of Fig. 13.
Figure 11:
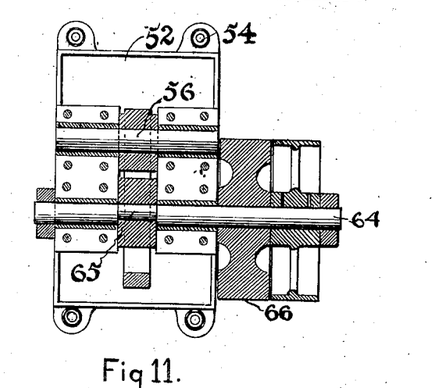
Fig. 11 is a sectional plan view on line Z—Z of Fig. 13.
Figure 12:
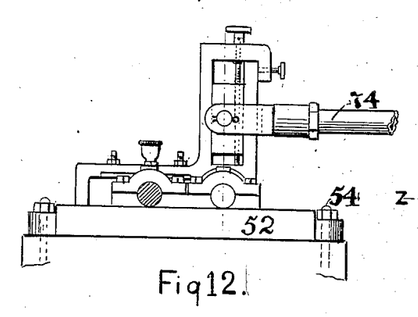
Fig. 12 is a side elevation of Fig. 13, with the drive pulleys removed.
Figure 13:
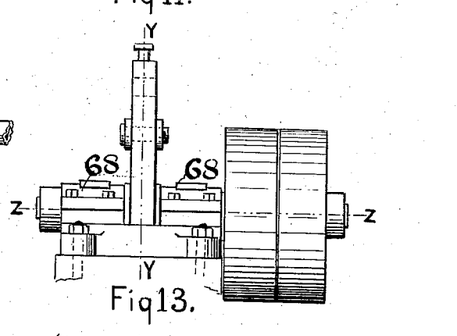
Fig. 13 is an end elevation of Fig. 9.

Through the base board 14 are air holes 41 around which are attached flexible tubes 42, that are connected with an air blast (not shown). For the purpose of spreading the air there are secured in the base board at various points around these holes 41 supports 44 extending a short distance above the base and on the top of these supports 44 is secured a flat plate as shown in Fig. 8. If it be desired to heat the air to be used then it will be brought to the required temperature before its introduction into the tube 42.

At the front of the jig is secured an air gage 46 which is flexibly connected to the inside of the jig beneath the canvas by the tube 48.

For the purpose of imparting to the jig the peculiar motions requisite for accomplishing the rapid and accurate separation of the ore from the gangue and the compound ore and gangue and delivering each into its designated discharge, there is provided a block 50 to which is bolted a frame 52 by bolts 54. In this frame 52 is pivoted an angular frame or double arm lever 55 by the pivot pin 56. This lever 55 is provided with a rectangular recess 58 in which is a block 60 and through which is an opening. Through the opening is a driving shaft 64 provided with an eccentric 65. To the outer end of the shaft 64 are secured driving pulleys 66 which are belted to the motor. The bearings 68 for the shaft are secured in the frame 52 on opposite sides of the lever 55. In the upright part of the lever 55 is a recess 70 in which is a block 72 to which is pivoted a shaft 74 and said shaft connected to the under side of the jig preferably near its center.

For the purpose of adjusting the block 72 to different positions in the recess 70 there is provided a screw bolt 75 which passes through the upper end of the lever 55 and through the block 72 which bolt is provided with a head 76. The upper end of the lever 55 is formed into an arm 78 which overlaps the side 80 of the lever 55, the side 80 being free and disconnected at the top from the overlapping arm 78. For the purpose of holding the block 72 in any adjusted position in the recess 70 there is provided a set screw 82 which passes through the arm 78 and impinges against the side 80 and when the block 72 has been adjusted to the desired position, then the screw 82 is tightened and springs the side against the block and firmly holds it in its adjusted position.

For the purpose of cushioning the motion of the jig and preventing the jar caused by its rapid forward and backward motion there is attached to each of the standards 5, on opposite sides a spring 81 which is also secured to the sides of the jig. The manner in which this construction will impart the desired movements to the jig will be as follows: When the shaft 64 is rotated by power applied to the drive pulley 66, the eccentric 65 will raise and lower the end of the lever 55 in which is the block 60 and rock its lever on its pivot 56; this will cause the upper end of the lever 55 to move forward and backward and as the shaft 74 is attached to the block 72 and to the body of the jig, it will draw the jig forward and push it backward and, as the jig is suspended on the hangers 15, it will also be given an upward and downward movement at each revolution of the shaft 64, and the movements of the jig will be substantially backward and forward and up and down in the arc of a circle. When it is desired to change the length of the movements of the jig to adapt it to different conditions of the mass to be separated, the screw 82 is loosened and the screw bolt 75 is adjusted to bring the block 72 higher or lower in the recess 70 according as it is desired to have the stroke of the shaft longer or shorter. It has been found that these movements of the jig in connection with the deflectors and their relative position on the jig have added largely to the capacity of a jig of given size to make rapid and accurate separation. Since these movements are very short and rapid and as the jig may be set horizontal or inclined longitudinally with the deflectors at an angle to the line of motion, the strata of gangue and ore at each forward and backward movement of the jig will be crowded in diagonally opposite directions and hence the separation will be forced and therefore exceedingly rapid.

It will be understood that all the mass of "run-of-mine", ore and rock is first crushed and then classified and that there is a jig provided with a bed of different size mesh, some coarser and some finer, according to the classification; and further that the deflectors will be so adjusted with reference to each other and the incline of the upper surface of the lower deflectors will be such that the runways will be of different decreasing depth and the openings underneath the deflectors 35 will be of different size to give sufficient room for the passage of the ore of the class to be separated along the runways and underneath the upper deflectors.

The mode of operating our device is substantially as follows: Power is applied to the shaft 74 which is attached to the under side of the jig and imparts to it the motions hereinbefore set out. The mass to be separated is introduced into the hopper 18 and passes down the chute 20 and is delivered entirely across the front end of the jig and preferably in such quantities as to fill between the deflectors. The four above described motions of the jig together with the constant pressure of the air from beneath, between the supports 22 and up through the mesh 25 will immediately stratify the mass by raising the gangue, which is lighter than the ore, up between the deflectors 35 and keeping the ore, which is heavier, below on the mesh, then the upper deflectors, by the movement of the jig will skim the upper stratum of gangue from off the stratum of ore and force it diagonally to the left side over the thin portion 30 of the deflectors 26 into the discharge 40 and the stratum of ore will be crowded diagonally by the lower deflectors along the runways 27 through the openings under the deflectors 35 toward the right side of the jig into the longitudinal runway 29 and be delivered into the discharge 36.

If any particles of ore are mingled with the gangue they will be separated from the gangue upon the left-hand side of the jig between the thin portion 30 of the deflectors 26 and will be carried across the machine under the deflectors 35 and into the discharge 36. Any particles or lumps of both gangue and ore that were not separated from each other when crushed, will be lighter than the ore and heavier than the gangue and hence will be directed toward the left by the upper deflectors 35 and when near the left side will pass underneath said deflectors and then be carried toward the right by the deflectors 26 then toward the left by the deflectors 35 along down the central portion of the jig and, since the deflectors at their shoulders 32 are of the same thickness near the tail of the jig that they are near the head, these particles of gangue and ore combined will be directed into the central discharge 38.

It will be seen that it is important that the lower deflectors incline on their upper surface thereby forming runways that decrease in depth from one end to the other and that the runways are at an angle to the line of motion of the jig. It also is important that the upper deflectors be secured on the upper surface of the lower deflectors whereby there will be formed openings beneath the upper deflectors that decrease in size from one side to the other of the jig and that the upper deflectors set at an angle to the lower deflectors and at an angle to the motion of the jig, for the constant pressure of air through the mass and the motion of the jig will keep the mass stratified with the ore beneath and the gangue above whether there be a small or large proportion of the ore, and then the upper deflectors will crowd the gangue from off the ore diagonally to the left side of the jig and the lower deflectors will force the ore along the runways through the openings underneath the upper deflectors and the particles of the mass containing both ore and gangue will be forced by the upper deflectors toward the left and when they come where they can pass under the upper deflectors they will be forced by the lower deflectors to the right and since they cannot pass under the upper deflectors at the right side of the jig, they will be forced by the upper deflectors to the left and eventually discharged over the tail at the center of the jig, and in this manner there will be a complete, pure and distinct separation of the ore, gangue and middlings whether the mass contains a large or small percentage of either.

Figure 6:
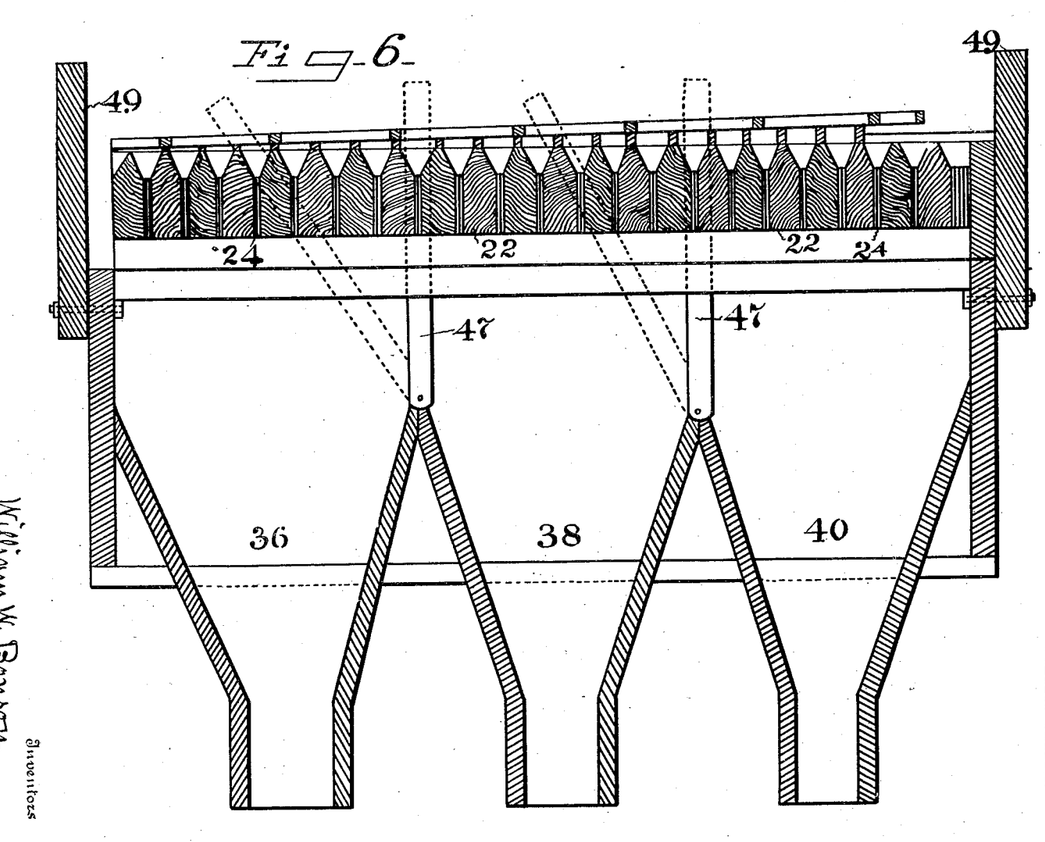
Fig. 6 is a cross section on line X—X Fig. 2, with the tail board removed.

When a large per cent. of the mass is gangue, then the operator can move the partition or gate 47 between the discharge 38 and the discharge 40 toward the right of the machine and this will give more space at the tail of the jig to deliver the gangue into the discharge 40 and if it be a larger percentage of ore, then another gate 47 is swung over toward the discharge 38. In this manner the quantity of either ore, gangue or middlings may be varied at will according as the mass has a greater or less percentage of ore, gangue or middlings.

It will be seen by the construction of the jig with two sets of deflectors, set one over the other and at an angle to the horizontal or longitudinally inclined surface, together with the longitudinal movement of the surface at an angle to the deflectors and the pressure of air partly lifting and holding up the gangue and stratifying the mass, that each forward and backward and upward and downward movement of the jig will force the stratum of gangue from off the ore and force it to one side over the deflectors 26 and also force the ore to the other side of the jig along the tapering runways 27 under the deflectors 35 and in this manner where the gangue is crowded to one side and the ore to the other, there will be a greatly increased rapidity of the separation of the ore over the separation in those devices wherein only motion and gravity are combined with the air in making the separation.

It will also be observed by making the lower deflectors thin at their beginnings, that are attached at intervals along the left side of the jig, then abruptly increasing their thickness to form shoulders, and gradually inclining their upper surface and gradually decreasing in thickness the beginnings of the deflectors that are attached along the front end of the machine and inclining them toward their outer ends thereby decreasing the depth of the runways and decreasing the size of the openings beneath the upper deflectors as they approach toward the right side of the jig, that thereby there will be completeness, accuracy and purity of the separation whether the percentage of ore in the mass be large or small.

Having now described our invention what we claim is:

1. In a dry ore separator, a jig, a mesh on the bed of the jig, means for forcing a current of air up through the mesh, means for imparting motion to the jig to aid the air in stratifying the mass, and means including longitudinally tapered deflectors connected with the jig for crowding and forcing the gangue from off the ore to one side of the jig and other deflectors for forcing the ore diagonally to the opposite side of the jig.

2. In a dry ore separator, a jig, hangers for flexibly suspending the jig on an incline longitudinally, a mesh upon the bed of the jig, means for forcing a constant current of air through the mesh and mass thereon, two series of deflectors secured upon the mesh at an angle to each other and to the motion of the jig forming diagonally disposed runways decreasing in depth on the surface of the mesh, and means connected with the jig and the hangers by which the jig is suspended for imparting to the jig a backward and forward movement in the arc of a circle, to force the gangue in one direction in the runways from off the ore to the side of the bed and the ore in the runways to the opposite side of the bed.

3. In a dry ore separator, a jig, a mesh upon the bed of the jig, deflectors having their upper surfaces beveled or inclined longitudinally and secured upon the bed of the jig at an angle to the length and motion of the jig, a second series of deflectors secured upon the first at an angle thereto and at an angle to the motion of the jig, means for forcing a constant current of air through the mesh between the deflectors, and means for imparting a forward and backward movement to the jig to aid the air in stratifying the mass and forcing the gangue in a diagonal direction off from the ore to one side of the jig and the ore to the other side between the lower deflectors.

4. In a dry ore separator, a jig, means for suspending the jig on an incline longitudinally, a mesh over the bed of the jig, a series of deflectors having their upper surfaces beveled or inclined longitudinally and set at an angle to the motion of the jig, a second series of deflectors of uniform size secured upon the first series at an angle thereto and an angle to the motion of the jig and having the upper surface of the deflectors inclining from one side to the other of the bed of the jig, means for forcing air through the mesh, and means for imparting to the jig an up and down and a forward and backward movement to force the gangue off the ore by the deflectors diagonally to one side of the jig and the ore by the lower deflectors to the other side of the jig.

5. In a dry ore separator, a jig, means for adjustably suspending the jig on an incline longitudinally, a mesh upon the jig, two series of deflectors secured upon the mesh at an angle to each other and to the motion of the jig and having the upper surface of the deflectors inclining from one side of the bed to the other at an angle to the plane of the base of the jig, means for forcing air upward through the mesh between the deflectors, and means for imparting to the bed a forward and backward movement at an angle to the deflectors to force the ore in a diagonal direction along one side of the deflectors to one side of the jig and the gangue to the opposite side of the jig from off the ore.

6. In a dry ore separator, a jig, means for adjustably suspending the jig on an incline longitudinally, a mesh upon the jig, a series of deflectors having their upper surface beveled or inclined longitudinally secured upon the mesh at an angle thereto and at an angle to the motion of the jig and forming upon the mesh diagonally disposed runways decreasing in depth from one side of the jig to the other, a second series of deflectors secured upon the first at an angle thereto and at an angle to the motion of the jig and having the upper plane of the surface of the deflectors when in position inclined from one side to the other of the jig and at an angle to the plane of the base of the jig, means for forcing a current of air up through the mesh and among the deflectors, and means for imparting to the jig a forward and backward and an up and down movement in the arc of a circle to force the gangue off the ore in the runways to one side of the jig and the ore along the runways to the opposite side.

7. In a dry ore separator, a jig, means for adjustably suspending the jig on an incline longitudinally, a mesh upon the jig, two series of deflectors, the under series secured to the jig at an angle thereto and at an angle to the motion of the jig and each deflector having its upper surface beveled or inclined longitudinally, the upper series secured upon the lower series at an angle thereto and providing openings beneath the upper deflectors and between the lower deflectors, a longitudinal runway in one side of the jig, means for forcing a current of air up through the mesh, and means for imparting motion in the arc of a circle to the jig to cause the deflectors to force the ore along the runways between the lower deflectors and beneath the upper deflectors into the runway on one side of the jig and the gangue to the opposite side of the jig from off the ore.

8. In a dry ore separator, a jig adjustably suspended on an incline longitudinally, a mesh upon said jig, deflectors upon the mesh at an angle to the length of the jig and forming diagonally disposed runways between the deflectors said runways decreasing in depth from one end to the other thereof, a longitudinally disposed runway at one side of the jig connecting with the ore discharge, means for forcing a constant current of air up through the mesh and runways to aid in stratifying the mass, and means for imparting to the jig a movement in the arc of a circle and at an angle to the line of the runways to crowd the stratum of ore along the runways to said runway in the side of the jig, and crowd the gangue diagonally to the opposite side of the jig off from the ore.

9. In a dry ore separator, a jig, means for adjustably suspending the jig on an incline longitudinally, a mesh on the bed of the jig, diagonally disposed runways decreasing in depth as they approach one side of the bed, means for forcing a constant current of air through the mesh, to aid in stratifying the mass, means for forcing the stratum of gangue from off the ore diagonally to one side of the bed while the ore is within the runways, and means for imparting to the jig a forward and backward and up and down movement to aid in stratifying the mass and to force the ore along the bottom of the runways to the opposite side of the bed away from the gangue after the gangue has been forced from off the ore.

10. In a dry ore separator, a jig set on an incline, a mesh upon the jig, a series of deflectors secured above the mesh at an angle to the length of the jig and said deflectors having their upper surface beveled or inclined longitudinally, a second series of deflectors of uniform shape secured on the first series of deflectors at an angle thereto and at an angle to the length of the jig and the plane of the upper surface of the deflectors at an angle to the inclined plane of the bed of the jig, means for forcing a constant current of air through the mesh and between the deflectors, and means for reciprocating the jig to force the gangue from off the ore diagonally to one side of the jig and the ore diagonally to the opposite side of the jig.

11. In a dry ore separator, a jig, a mesh upon the jig, two series of deflectors set upon the mesh at an angle to the length of the bed and an angle to each other and having the plane of the upper surface at an angle to the lateral plane of the bed of the jig, means for forcing air up through the mesh and between the deflectors, and means for imparting to the jig a reciprocating motion at an angle to the upper surface of the deflectors.

12. In a dry ore separator, a jig, a mesh on the jig, a series of deflectors upon the mesh formed with a thin portion near the end, then abruptly increased in thickness and then inclined or beveled on their upper surface lengthwise to their ends said deflectors set at an angle to the motion of the jig, a second series placed upon the inclined surface of the first series at an angle thereto and at an angle to the length of the jig, means for forcing air up through the mesh, and means for imparting to the jig a reciprocatory movement at an angle to the deflectors.

13. In an ore separator, a jig, a mesh on the jig, a series of deflectors upon the mesh formed with a thin portion for a short distance along their ends where they are attached to the side of the jig, said deflectors abruptly increasing in thickness then inclined on their upper surface to the ends of the deflectors said deflectors extending diagonally to near the opposite side of the jig and set at an angle to the motion of the jig, a second series of deflectors secured upon the first at an angle thereto and at an angle to the motion of the jig and extending from near one side to the opposite side of the jig, a longitudinal runway along one side of the jig near the ends of both series of deflectors and connected with the discharge, means for forcing air up through the mesh and among the deflectors, and means for imparting a reciprocating motion to the bed.

14. In a dry ore separator, a jig, a mesh on the bed of the jig, means for forcing a current of air through the mesh, means for imparting motion to the jig to aid the air in stratifying the mass, longitudinally tapered deflectors, said deflectors forming runways decreasing in depth between the same, and a series of deflectors over the runways and at an angle thereto and at an angle to the motion of the jig.

15. In a dry ore separator, a jig, a mesh on the bed of the jig, means for forcing a current of air through the mesh, means for imparting motion to the jig, longitudinally tapered deflectors set at an angle to the motion of the jig forming diagonally disposed runways decreasing in depth, deflectors set upon said tapered deflectors and over said runways.

16. In a dry ore separator a jig, a mesh on the bed of the jig, means for forcing a current of air through the mesh, deflectors of uniform thickness for a short distance then abruptly increasing in thickness, then longitudinally tapered toward their other end set upon the jig and diagonally disposed to the motion of the jig and forming diagonally disposed runways of uniform depth for a short distance then abruptly increasing in depth and then decreasing in depth toward their opposite ends, other deflectors set upon the tapered portion of the first deflectors and at an angle thereto, and means for imparting motion to the jig.

In testimony whereof we affix our signatures, in presence of two witnesses.

WILLIAM W. BONSON.
WILLSON L. McLAUGHLIN.

Witnesses:
M. M. CADY,
V. L. HATTER.